(12) United States Patent
Mochizuki et al.

(10) Patent No.: US 10,717,357 B2
(45) Date of Patent: Jul. 21, 2020

(54) DIAL PLATE AND AUTOMOTIVE METER

(71) Applicant: Yazaki Corporation, Tokyo (JP)

(72) Inventors: Yasufumi Mochizuki, Shizuoka (JP);
Tatsuya Hattori, Shizuoka (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 98 days.

(21) Appl. No.: 15/472,683

(22) Filed: Mar. 29, 2017

(65) Prior Publication Data

US 2017/0282716 A1    Oct. 5, 2017

(30) Foreign Application Priority Data

Mar. 30, 2016  (JP) ................. 2016-067748
Mar. 14, 2017  (JP) ................. 2017-048976

(51) Int. Cl.
*B60Q 3/14*       (2017.01)
*B60K 35/00*     (2006.01)
(Continued)

(52) U.S. Cl.
CPC .............. *B60K 35/00* (2013.01); *B60K 37/02* (2013.01); *B60Q 3/14* (2017.02); *B60Q 3/20* (2017.02);
(Continued)

(58) Field of Classification Search
CPC .............. B60K 2350/203; B60K 35/00; B60K 235/00; B60K 37/02; B60K 2370/167;
(Continued)

(56) References Cited

U.S. PATENT DOCUMENTS 4,403,818 A     9/1983   Kleinbohl
5,741,058 A *   4/1998   Suzuki ................... B60K 35/00
                                                                  362/23.01
(Continued)

FOREIGN PATENT DOCUMENTS

CN          1383483 A       12/2002
CN        101111879 A        1/2008
(Continued)

OTHER PUBLICATIONS

Communication dated Mar. 4, 2019, from the State Intellectual Property Office of People's Republic of China in counterpart Application No. 201710203550.7.
(Continued)

*Primary Examiner* — Arman B Fallahkhair
(74) *Attorney, Agent, or Firm* — Sughrue Mion, PLLC

(57) ABSTRACT

A dial plate is provided with a mark layer having translucency, the mark layer including numbers of linear grooves formed on a surface of the mark layer, and a reflective layer that is arranged on a back face side of the mark layer, and reflects light incident from the mark layer side. The reflective layer includes a light transmission area that allows the light emitted from a light source arranged on the back face side to transmit therethrough to a front face side, and displays a display design by the light transmitting through the light transmission area when the light source is turned on. In the reflective layer, at least the light transmission area is composed of pearl ink.

2 Claims, 10 Drawing Sheets

(51) Int. Cl.
*B60K 37/02* (2006.01)
*B60Q 3/20* (2017.01)
*G01D 11/28* (2006.01)

(52) U.S. Cl.
CPC ........ *G01D 11/28* (2013.01); *B60K 2370/167* (2019.05); *B60K 2370/20* (2019.05); *B60K 2370/23* (2019.05); *B60K 2370/27* (2019.05); *B60K 2370/34* (2019.05); *B60K 2370/341* (2019.05); *B60K 2370/52* (2019.05); *B60K 2370/693* (2019.05); *B60K 2370/695* (2019.05)

(58) Field of Classification Search
CPC ........ B60K 2370/693; B60K 2370/695; B60K 2370/27; B60K 2370/52; B60K 2370/20; B60K 2370/23; B60K 2370/34; B60K 2370/341; B60Q 3/14; B60Q 3/20; G01D 11/28

See application file for complete search history.

(56) References Cited

U.S. PATENT DOCUMENTS

| | | | |
|---|---|---|---|
| 6,520,651 | B1 | 2/2003 | Yokoyama et al. |
| 6,520,654 | B2* | 2/2003 | Angell ............... B60K 37/02 116/DIG. 36 |
| 6,753,068 | B2* | 6/2004 | Nakamura ............... 428/172 |
| 7,015,986 | B2* | 3/2006 | Brandt ............... G01D 7/002 349/58 |
| 7,079,452 | B2* | 7/2006 | Harrison ............... 368/82 |
| 2002/0135995 | A1 | 9/2002 | Fujita et al. |
| 2007/0089665 | A1* | 4/2007 | Suzuki ............... 116/245 |
| 2008/0123473 | A1* | 5/2008 | Ozawa ............... 362/18 |
| 2008/0158852 | A1 | 7/2008 | Fukushima et al. |
| 2009/0265969 | A1 | 10/2009 | Nezu |
| 2010/0326348 | A1 | 12/2010 | Oguro et al. |
| 2014/0036472 | A1 | 2/2014 | Ishihara et al. |
| 2016/0238418 | A1 | 8/2016 | Fujita et al. |
| 2017/0106628 | A1 | 4/2017 | Hattori et al. |
| 2017/0106810 | A1 | 4/2017 | Hattori et al. |
| 2017/0232843 | A1 | 8/2017 | Hattori et al. |
| 2017/0328749 | A1 | 11/2017 | Hattori et al. |
| 2018/0104975 | A1 | 4/2018 | Nagano et al. |

FOREIGN PATENT DOCUMENTS

| | | |
|---|---|---|
| CN | 101567154 A | 10/2009 |
| CN | 101932916 A | 12/2010 |
| CN | 103278459 A | 9/2013 |
| CN | 105068168 A | 11/2015 |
| DE | 30 23 905 A1 | 1/1982 |
| DE | 100 24 232 A1 | 11/2001 |
| DE | 10 2013 215 112 A1 | 2/2014 |
| DE | 11 2014 005 403 T5 | 8/2016 |
| DE | 10 2016 220 331 A1 | 4/2017 |
| DE | 10 2016 220 327 B4 | 8/2017 |
| DE | 10 2017 202 488 A1 | 8/2017 |
| DE | 11 2015 006 262 T5 | 11/2017 |
| EP | 1977370 A4 | 2/2011 |
| JP | 5-216123 A | 8/1993 |
| JP | 2008-89479 A | 4/2008 |
| JP | 2008-134164 A | 6/2008 |
| JP | 2009-265407 A | 11/2009 |
| JP | 2012-037438 A | 2/2012 |
| JP | 2014-32089 A | 2/2014 |

OTHER PUBLICATIONS

Communication dated Mar. 21, 2019, issued by the German Patent Office in counterpart German Application No. 10 2017 205 342.9.
Communication dated Apr. 2, 2019, from the Japanese Patent Office in counterpart application No. 2017-048976.

* cited by examiner

DIAL PLATE AND AUTOMOTIVE METER

CROSS-REFERENCE TO RELATED APPLICATION(S)

The present application claims priority to and incorporates by reference the entire contents of Japanese Patent Application No. 2016-067748 filed in Japan on Mar. 30, 2016 and Japanese Patent Application No. 2017-048976 filed in Japan on Mar. 14, 2017.

BACKGROUND OF THE INVENTION

1. Field of the Invention

The present invention relates to a dial plate and an automotive meter.

2. Description of the Related Art

Conventionally, there has been a metallic dial plate on which fine grooves are formed. For example, Japanese Patent Application Laid-open No. 2012-37438 discloses a technique of a dial plate provided with a transparent substrate having a light transmissive property, a mark part comprising hairline-like unevenness formed on the back face of the transparent substrate, and a mirror layer that reflects external light, which is light incident from the front side of the transparent substrate arranged on the back face of the mark part. The mirror layer in Japanese Patent Application Laid-open No. 2012-37438 provides thereto a cutout corresponding to a display design.

In the dial plate in Japanese Patent Application Laid-open No. 2012-37438, illumination light incident from the back face of the dial plate reaches the eyes of an occupant in front of the dial plate through the cutout corresponding to the display design provided to the mirror layer. Accordingly, the display design is illuminated and recognized visually.

Here, when a light source arranged on the back face side of the dial plate is in an off-state, it is desirable that the display design can be obscured. The cutout of the display design provided to the mirror layer is conspicuous since the cutout is, for example, observed in a blackened manner when the light source is turned off. In view of improving the design property of the dial plate, it is desirable that the display design be inconspicuous when the light source is turned off.

SUMMARY OF THE INVENTION

It is an object of the present invention to provide a dial plate and an automotive meter in which the display design is inconspicuous when the light source is not turned on.

In order to achieve the above mentioned object, a dial plate according to one aspect of the present invention includes a mark layer configured to transmit light, the mark layer including numbers of linear grooves formed on a surface of the mark layer; and a reflective layer arranged on a back face side of the mark layer, the reflective layer being configured to reflect light incident from the mark layer side, wherein the reflective layer includes a light transmission area configured to allow light which is emitted from a light source arranged on the back face side of the light transmission area to transmit through the light transmission area to a front face side of the light transmission area, and displays a display design by the light transmitting through the light transmission area when the light source is turned on, and at least the light transmission area in the reflective layer is composed of pearl ink.

According to another aspect of the present invention, in the dial plate, it is preferable that an area other than the light transmission area in the reflective layer is composed of pearl ink.

According to still another aspect of the present invention, in the dial plate, it is preferable that an area other than the light transmission area in the reflective layer is composed of mirror ink.

According to still another aspect of the present invention, an automotive meter includes a dial plate including a mark layer configured to transmit light, the mark layer including numbers of linear grooves formed on a surface of the mark layer, and a reflective layer arranged on a back face side of the mark layer, the reflective layer being configured to reflect light incident from the mark layer side; and a light source arranged on the back face side of the reflective layer, wherein the reflective layer includes a light transmission area configured to allow light which is emitted from the light source to transmit through the light transmission area to a front face side of the light transmission area, and displays a display design by the light transmitting through the light transmission area when the light source is turned on, and at least the light transmission area in the reflective layer is composed of pearl ink.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a dial plate and an automotive meter according to embodiments of the present invention are specifically explained with reference to drawings. Here, the present invention is not limited to these embodiments. Furthermore, constitutional features in the following embodiments include a part that is easily conceivable by those skilled in the art, or parts substantially equal to each other.

First Embodiment

Figure 1:
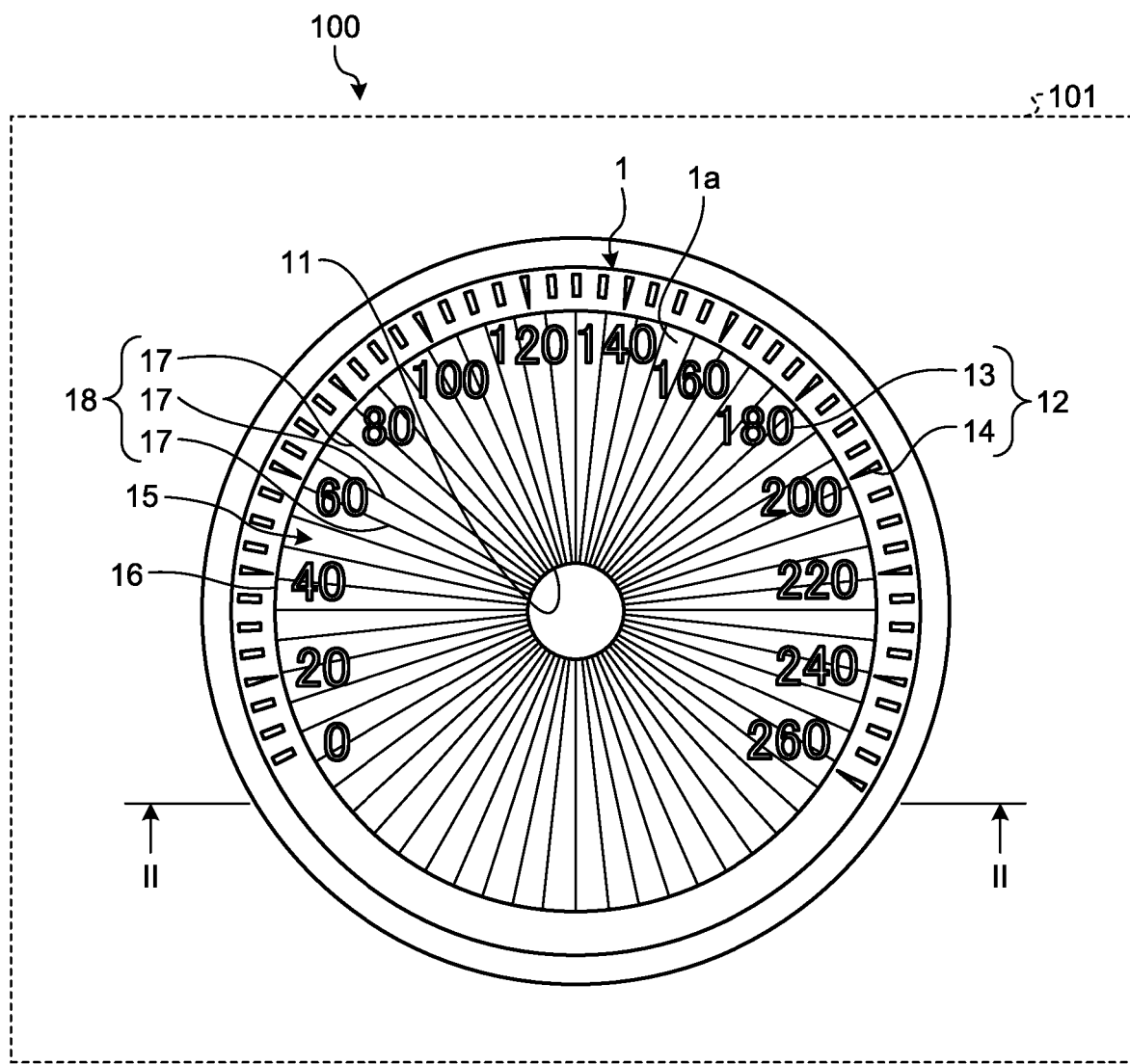
FIG. 1 is a plan view of an automotive meter according to a first embodiment.
Figure 2:
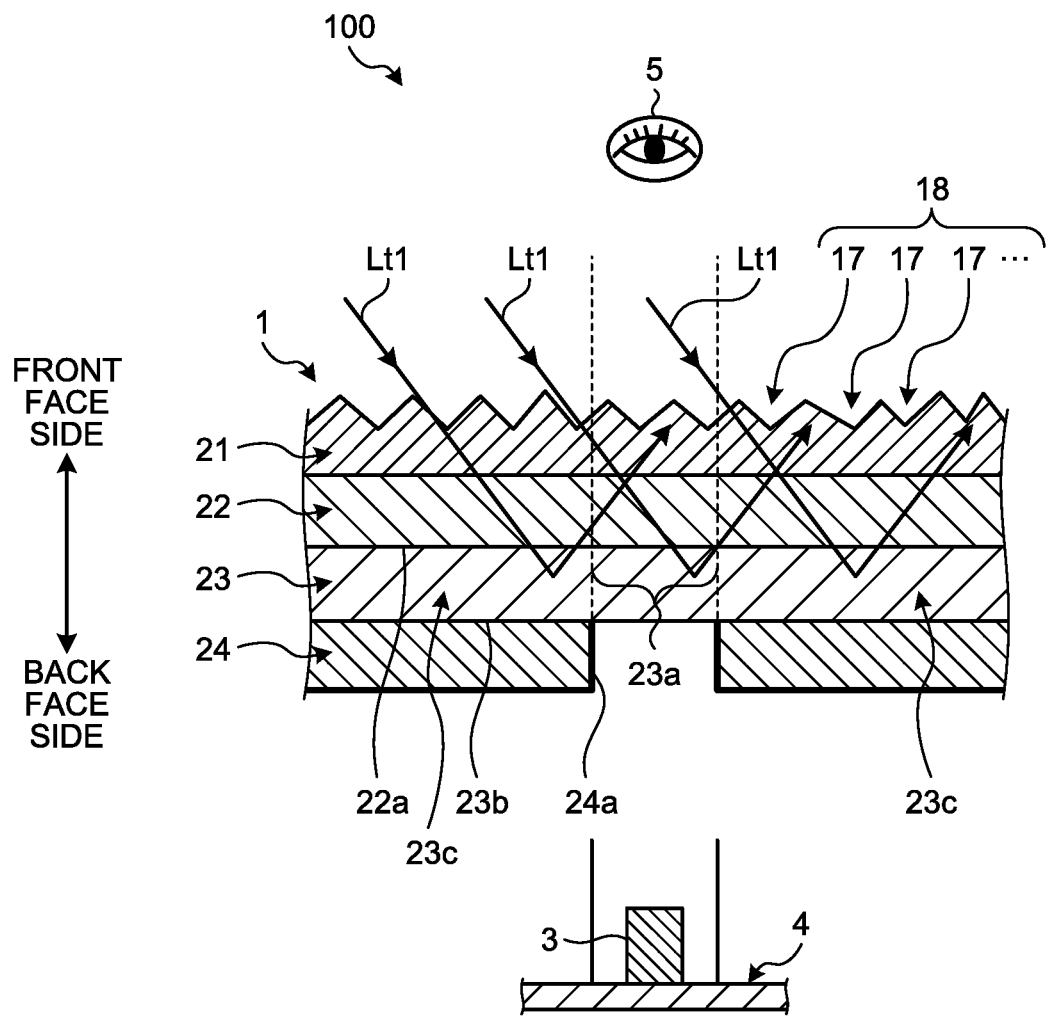
FIG. 2 is a sectional view of the automotive meter according to the first embodiment.
Figure 3:
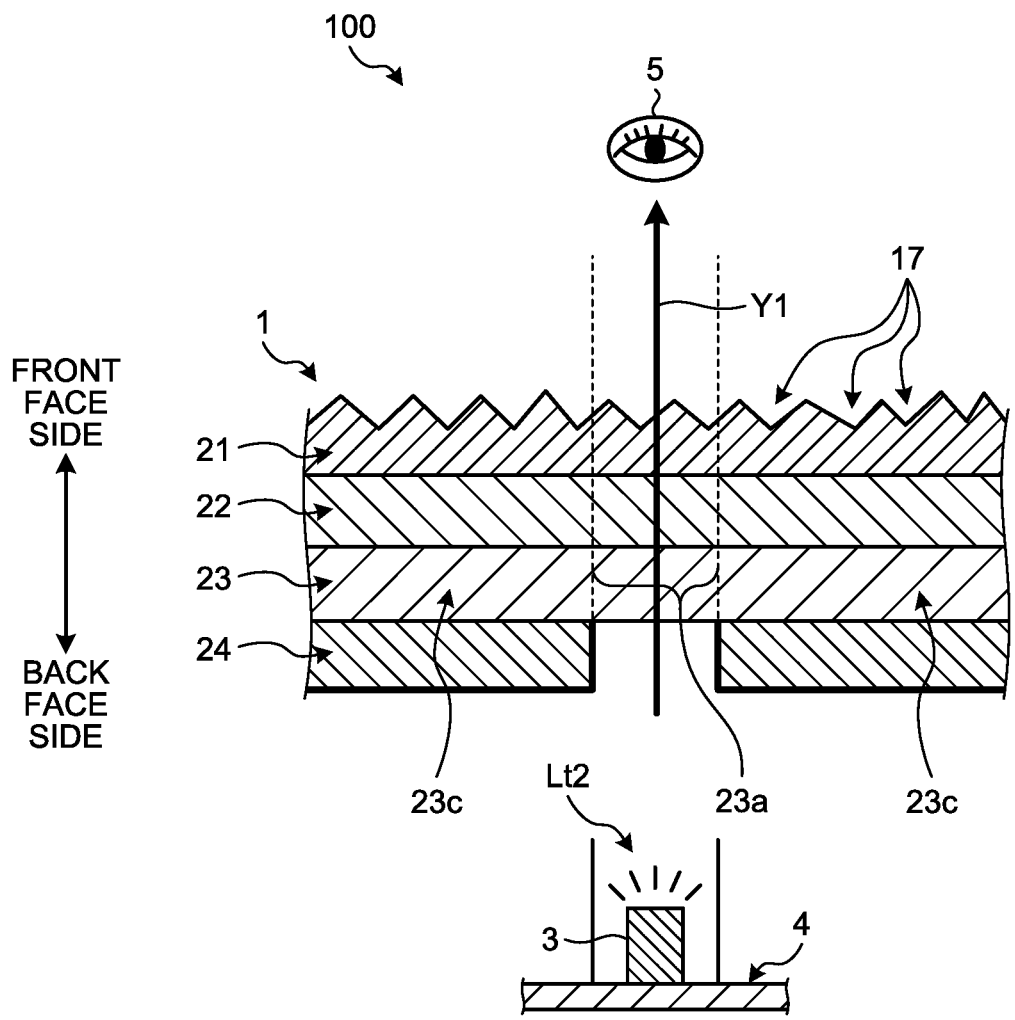
FIG. 3 is a sectional view illustrating the on-state of a light source in the automotive meter according to the first embodiment.

A first embodiment is explained with reference to FIG. 1 to FIG. 3. The first embodiment relates to a dial plate and an automotive meter. FIG. 1 is a plan view of the automotive meter according to the first embodiment, FIG. 2 is a sectional view of the automotive meter according to the first embodiment, and FIG. 3 is a sectional view illustrating the on-state of a light source in the automotive meter according to the first embodiment. FIG. 2 and FIG. 3 are sectional views each of which is taken along a line II-II in FIG. 1.

As illustrated in FIG. 1, an automotive meter 100 according to the first embodiment has a case 101, and a dial plate 1. As illustrated in FIG. 2, the automotive meter 100 further includes at least one light source 3. The automotive meter 100 is, for example, arranged in an instrument panel in front of a driver's seat. The case 101 is fixed to an automotive body-side member such as the instrument panel. The case 101 has an opening corresponding to the dial plate 1. The dial plate 1 is engaged with the opening of the case 101 to close the opening. The automotive meter 100 in the first embodiment is a combination meter having a plurality of dial plates including the dial plate 1 illustrated in FIG. 1. The dial plate 1 in the first embodiment is a dial plate of a speed meter that indicates the travel speed of an automobile on which the automotive meter 100 is mounted.

The dial plate 1 is a disc-like member. As illustrated in FIG. 1, a through hole 11 in which the rotational shaft of an indicating needle (not illustrated in the drawings) is inserted is formed in the central portion of the dial plate 1. The dial plate 1 includes an index 12 arranged in the outer edge portion thereof. The index 12 includes a plurality of character indexes 13 and a plurality of scale indexes 14. Each of the scale indexes 14 is a speed index to be pointed by the indicating needle. Each of the character indexes 13 is a numerical index of a speed value corresponding to the scale index 14. The character indexes 13 and the scale indexes 14 are arranged at predetermined intervals along the circumferential direction. The scale index 14 is arranged on the outside of the character index 13 in the radial direction. Each of the character index 13 and the scale index 14 may be, for example, an index formed by printing, an index that emits light by the light incident from the back face side thereof, or a convex portion or a concave portion that are formed in the dial plate 1.

The dial plate 1 has a mark area 15. In the dial plate 1 according to the first embodiment, the mark area 15 is provided to a front face 1a of the dial plate 1. Here, with respect to the dial plate 1 and the automotive meter 100, "front face side" indicates a driver's seat side, and typically indicates the rear side of an automobile. Accordingly, the front face 1a of the dial plate 1 is a surface that faces the driver's seat in an opposed manner. With respect to the dial plate 1 and the automotive meter 100, "back face side" indicates a side opposite to the driver's seat side, and typically indicates the front side of the automobile. The mark area 15 is an area between the through hole 11 and an outer boundary line 16 in the front face 1a of the dial plate 1. The outer boundary line 16 is formed in a circular shape concentric with the through hole 11, and divides the character index 13 from the scale index 14.

The mark area 15 has a mark 18 constituted of numbers of linear grooves 17. In the mark 18 according to the first embodiment, the grooves 17 are arranged in a radially extending manner about the through hole 11 set as a center. The groove 17 is actually extremely small in width and depth, and the grooves 17 are arranged at extremely small intervals. Accordingly, it is difficult to visually recognize the grooves 17. The grooves 17 whose number is more than that of the example illustrated in FIG. 1 or the like are formed on the dial plate 1. The mark 18 is a rising-sun-like mark that exhibits rising-sun-like luster by numbers of grooves 17.

As illustrated in FIG. 2, the dial plate 1 has a mark layer 21, a base material layer 22, a reflective layer 23, and a light shielding layer 24. The mark layer 21, the base material layer 22, the reflective layer 23, and the light shielding layer 24 are laminated towards the back face side from the front-face side of the dial plate 1 in this order. That is, in the dial plate 1, the mark layer 21 is a layer arranged closest to the driver's seat.

The mark layer 21 is a layer having translucency. The mark layer 21 is, for example, formed of a synthetic resin material (acrylate resin, polycarbonate or the like). The mark 18 is formed on the front face 1a of the mark layer 21. The mark 18 is, for example, formed by a forming mold.

The base material layer 22 is a main body part of the dial plate 1. The base material layer 22 is a layer having translucency, and formed of a synthetic resin material or the like. The mark layer 21 and the base material layer 22 may be any of a colorless layer and a colored layer, and may be any of a transparent layer and a semitransparent layer. The mark layer 21 and the base material layer 22 are integrally formed with each other by adhesion, welding, two color molding, or the like. Here, the mark 18 may be formed by imprint molding that applies ultraviolet rays or heat to the base material layer 22.

The reflective layer 23 is a layer that is arranged on the back face side of the mark layer 21, and reflects light incident from the mark layer 21 side. The reflective layer 23 in the first embodiment is formed on the back face side of the base material layer 22. The reflective layer 23 is capable of reflecting at least light incident from the front face side thereof. The reflective layer 23 in the first embodiment is an ink layer printed on a back face 22a of the base material layer 22. The reflective layer 23 in the first embodiment is composed of pearl ink. The pearl ink is ink containing pearl pigment, and exhibits luster and interference colors depending on a visual angle with respect to the dial plate 1. The pearl pigment is pigment containing mica, $SiO_2$, $Al_2O_3$, or the like that are low in refractive index, and coated with metal oxide (titanium oxide, iron oxide, or the like) being high in refractive index. The pearl ink is such that a pigment having a high refractive index and a pigment having a low refractive index are arrayed in a layered manner to bring about multiple reflections and the interference of reflected light. The pearl ink has both a reflection property and a transmission property. Accordingly, the reflective layer 23 reflects the light incident from the front face side thereof, and generates luster.

When the mark layer 21 reflects light, an area of a part of the mark 18 shines. Typically, in the mark 18, an area of a line shape, a strip shape, or a sector shape along the radial direction shines. That is, the mark area 15 where light is incident exhibits rising-sun-like luster. In the dial plate 1 according to the first embodiment, the reflection of light incident on the reflective layer 23, and the rising-sun-like luster generated on the mark layer 21 achieve a metallic dial plate having a metallic feeling.

As illustrated in FIG. 2, the reflective layer 23 has a light transmission area 23a. The light transmission area 23a is an area that allows light to transmit therethrough at least from the back face side to the front face side thereof. The reflective layer 23 in the first embodiment is composed of pearl ink, and allows light to transmit therethrough from the back face side to the front face side, and from the front face side to the back face side.

The light shielding layer 24 is formed on the back face side of the reflective layer 23. The light shielding layer 24 in the first embodiment is a print layer composed of black ink, the print layer being printed on a back face 23b of the reflective layer 23. That is, the light shielding layer 24 is laminated on the back face 23b of the reflective layer 23. The light shielding layer 24 covers an area (hereinafter, referred to as "other area") 23c other than the light transmission area 23a of the reflective layer 23 from the back face side of the reflective layer 23. The other area 23c is an area surrounding the light transmission area 23a, and also an area except the light transmission area 23a. The light shielding layer 24 has a hollow area 24a formed in a shape corresponding to the light transmission area 23a. The light shielding layer 24 prevents the light emitted from the light source 3 mentioned below from being incident on the other area 23c.

The light source 3 is arranged on the back face side of the dial plate 1. The light source 3 is, for example, a light emitting diode (LED). The light source 3 is held by a board 4 arranged on the back face side of the dial plate 1. The light source 3 is arranged at a position such that the light source 3 faces the light transmission area 23a in an opposed manner. In the board 4, for example, the light sources 3 are arranged to face the respective light transmission areas 23a one-to-one. The board 4 has a control circuit that controls turning on/turning off of the light source 3.

The shape of the light transmission area 23a as viewed from the front face side of the dial plate 1 is the shape of a display design. That is, the shape of the hollow area 24a in the light shielding layer 24 is formed in the shape of the display design. The display design is a design of characters or patterns according to warning information or the state of an automobile. As the display design, there are various kinds of designs indicated on the dial plate 1, such as a pattern that indicates an operated condition of an operation device such as a turn-signal lamp, and a pattern that indicates an alarm for equipment such as a battery.

As illustrated in FIG. 2, in a state that the light source 3 is turned off, the light transmission area 23a reflects a light Lt1 incident from the mark layer 21 side in the same manner as the case of the other area 23c. Accordingly, the light transmission area 23a exhibits luster in the same manner as the case of the other area 23c to produce the metallic feeling of the dial plate 1. Furthermore, the light transmission area 23a covers the space on the back face side thereof to obscure the existence of the hollow area 24a in the light shielding layer 24. That is, the light transmission area 23a obscures the display design in a state that the light source 3 is turned off.

As illustrated in FIG. 3, in a state that the light source 3 is turned on, the light transmission area 23a allows a light Lt2 emitted from the light source 3 to transmit therethrough to the front face side of the light transmission area 23a as indicated by arrow Y1. By contrast, the light shielding layer 24 shields light heading to the other areas 23c from the back face side, the light including light emitted from the light source 3. The light transmitting through the light transmission area 23a (hereinafter, simply referred to as "transmitting light") displays the display design corresponding to the shape of the light transmission area 23a on the dial plate 1. That is, the dial plate 1 displays a display design by the light transmitting through the light transmission area 23a when the light source 3 is turned on.

In the dial plate 1 according to the first embodiment, the other area 23c is shielded by the light shielding layer 24. Accordingly, in a state that the light source 3 is turned on, the contrast of luminance of the light transmission area 23a with respect to the other area 23c is improved. Consequently, the dial plate 1 in the first embodiment is capable of improving the visibility of the display design.

As explained heretofore, the dial plate 1 according to the first embodiment is configured to transmit light, the dial plate 1 including the mark layer 21 having numbers of linear grooves 17 formed on a surface thereof, and the reflective layer 23 that is arranged on the back face side of the mark layer 21, and reflects the light Lt1 incident from the mark layer 21 side. The reflective layer 23 has the light transmission area 23a that allows the light Lt2 emitted from the light source 3 arranged on the back face side thereof to transmit therethrough to the front face side. The reflective layer 23 displays the display design by the light that passes through the light transmission area 23a when the light source 3 is turned on. In the reflective layer 23, at least the light transmission area 23a is composed of pearl ink. In the dial plate 1 and the automotive meter 100 having the dial plate 1 according to the first embodiment, the light transmission area 23a is composed of pearl ink having transparency and reflectivity thus obscuring the display design when the light source 3 is turned off. Accordingly, the design property of dial plate 1 is improved.

Furthermore, in the dial plate 1 according to the first embodiment, the other area 23c in the reflective layer 23 is also composed of pearl ink. Typically, the reflective layer 23 is entirely composed by pearl ink. The other area 23c is also composed of pearl ink and hence, integrity or continuity in the external appearance of the reflective layer 23 is hardly lowered. In a state that the light source 3 is turned off, the appearance of the light transmission area 23a and the appearance of the other areas 23c coincide or substantially coincide with each other, or the light transmission area 23a and the other areas 23c have similarity in appearance to the extent that they are hardly discriminated thus improving the design property of the dial plate 1.

In the dial plate 1 according to the first embodiment, the mark 18 is formed on the front face of the mark layer 21. Alternatively, the mark 18 may be formed on the back face of the mark layer 21.

First Modification of First Embodiment

Figure 4:
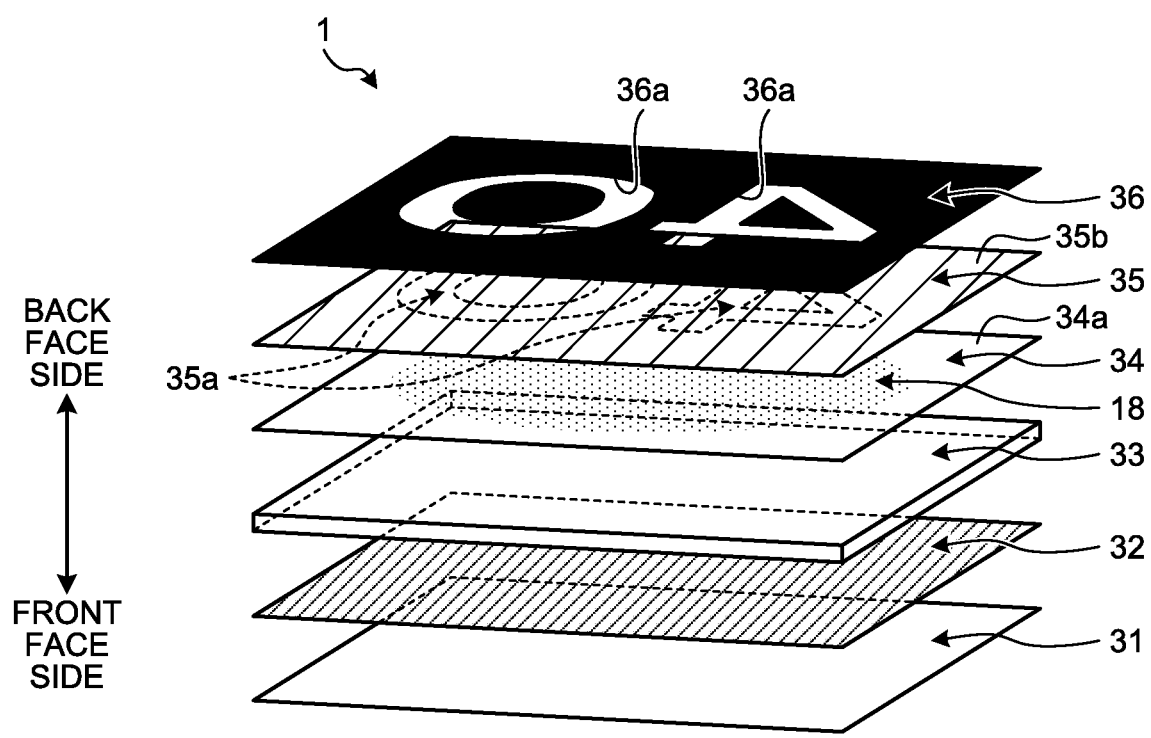
FIG. 4 is a view illustrating a layer structure of a dial plate according to a first modification of the first embodiment.

The first modification of the first embodiment is explained. FIG. 4 is a view illustrating a layer structure of a dial plate according to the first modification of the first embodiment. As illustrated in FIG. 4, the dial plate 1 according to the first modification has a top coat layer 31, a transparent smoke layer 32, a base material layer 33, a mark layer 34, a reflective layer 35, and a light shielding layer 36. The top coat layer 31 is a transparent coating layer that coats the front face of the dial plate 1. The transparent smoke layer 32 is a semitransparent layer that adjusts the tint of the dial plate 1. The transparent smoke layer 32 is, for example, formed by smoke printing. The base material layer 33 is a main body part having translucency in the same manner as the case of the base material layer 22 in the first embodiment.

The mark layer 34 has translucency, and the mark 18 is formed on a surface of the mark layer 34. The mark 18 is, for example, a rising-sun patterned mark having numbers of grooves 17 arranged in a radially extending manner in the same manner as the case of the mark 18 in the first embodiment. The mark 18 may be formed on the front face of the mark layer 34, or may be formed on a back face 34a of the mark layer 34. The mark 18 in the first modification is, for example, formed by imprint molding with the use of ultraviolet rays or heat.

The reflective layer 35 is entirely composed of pearl ink in the same manner as the case of the reflective layer 23 in the first embodiment. The reflective layer 35 is a printed pearl-ink layer printed on the back face 34a of the mark layer 34. The reflective layer 35 has a light transmission area 35a. The light transmission area 35a is an area that allows light to transmit to the front face side thereof from the back face side thereof.

The light shielding layer 36 is formed on the back face side of the reflective layer 35. The light shielding layer 36 is, for example, a printed black-ink layer printed on the back face of the reflective layer 35. The light shielding layer 36 has at least one hollow area 36a. The light shielding layer 36 covers other area 35b in the reflective layer 35 from the back face side of the reflective layer 35. The other area 35b is an area other than the light transmission area 35a in the reflective layer 35. That is, in the reflective layer 35, the area covered by the light shielding layer 36 constitutes a shielding area that substantially prohibits light from transmitting therethrough. In the reflective layer 35, the area exposed without being covered by the light shielding layer 36 constitutes the light transmission area 35a that allows light to transmit therethrough.

The shape of each of the light transmission area 35a and the hollow area 36a is a shape corresponding to a shape that constitutes a display design. The display design may be, for example, constituted of characters such as the numeric characters illustrated in FIG. 4. The light transmission area 35a in FIG. 4 displays the display design constituted of two numeric characters "4" and "0."

Second Modification of First Embodiment

Figure 5:
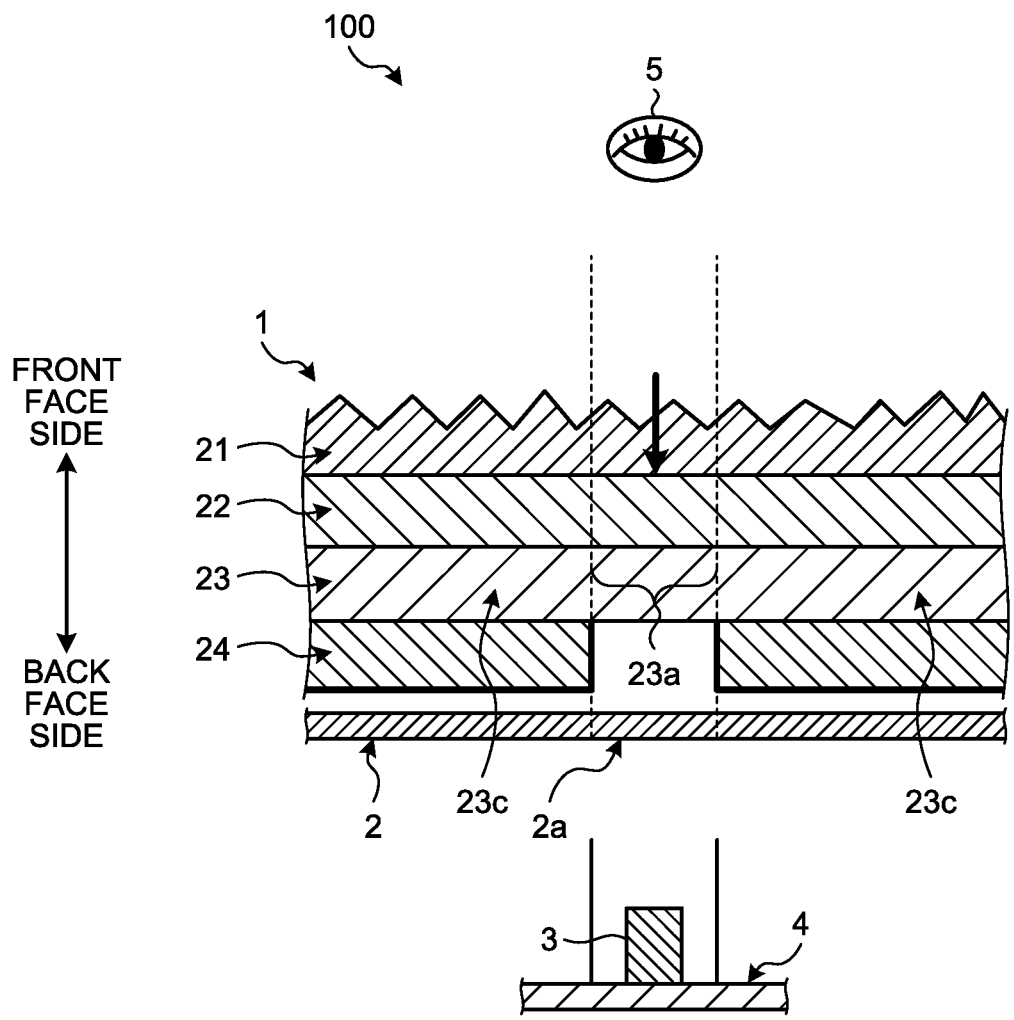
FIG. 5 is a sectional view of an automotive meter according to a second modification of the first embodiment.
Figure 6:
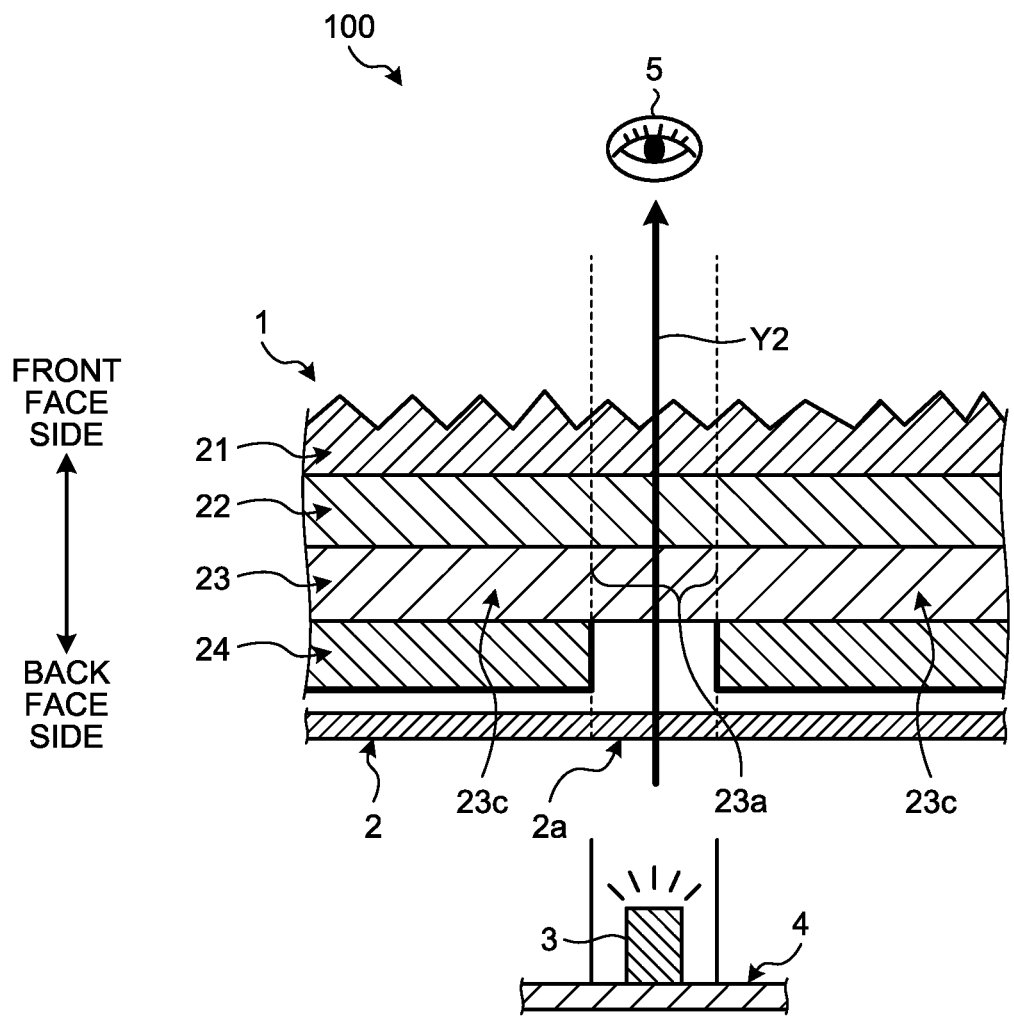
FIG. 6 is a sectional view illustrating the on-state of the light source in the automotive meter according to the second modification of the first embodiment.

The second modification of the first embodiment is explained. FIG. 5 is a sectional view of an automotive meter according to the second modification of the first embodiment, and FIG. 6 is a sectional view illustrating the on-state of a light source in the automotive meter according to the second modification of the first embodiment. In an automotive meter 100 in the second modification, a display design 2a is arranged on the back face side of the reflective layer 23.

As illustrated in FIG. 5, in the automotive meter 100 according to the second modification, a design dial plate 2 having the display design 2a is arranged on the back face side of the dial plate 1. The design dial plate 2 is arranged in the vicinity of the dial plate 1. The design dial plate 2 applies thereto light blocking printing except the area corresponding to the shape of the display design 2a.

The light sources 3 are arranged on the back face side of the design dial plate 2. The light sources 3 are held by the board 4 arranged on the back face side of the design dial plate 2. In the board 4, the light sources 3 are arranged to face respective display designs 2a one-to-one. The light sources 3 emit light to the display designs 2a from the back face side.

The reflective layer 23 has the light transmission area 23a that faces the display design 2a and allows light to transmit therethrough. The light transmission area 23a allows the light incident from the display design 2a side to transmit therethrough to the front-face side. The reflective layer 23 in the second modification is a semi-transmissive layer that is composed of pearl ink, transmits a part of light therethrough, and reflects a part of the light. Accordingly, the light transmission area 23a allows the light that have been emitted from the light source 3 and passed through the display design 2a to transmit therethrough to the base material layer 22 side as indicated by arrow Y2 in FIG. 6. Due to such constitution, the display design 2a is projected towards the front face side from the dial plate 1, and the pattern of the display design 2a can be recognized visually by a driver 5.

In this manner, in the dial plate 1 according to the second modification, the reflective layer 23 is composed of pearl ink. The reflective layer 23 allows, when the light source 3 is turned on, light to transmit therethrough to the front face side after the light passes through the display design 2a. The reflective layer 23 reflects, when the light source 3 is turned off, the light incident from the front face side so as to obscure the display design 2a, and the display design 2a becomes inconspicuous. Accordingly, the dial plate 1 in the second modification obscures the display design 2a when the light source 3 is turned off thus improving the design property.

Third Modification of First Embodiment

The pattern of the mark 18 is not limited to a rising-sun pattern. The pattern of the mark 18 may be a spin pattern or the like. The mark 18 having the spin pattern is formed in such a manner that a plurality of fine grooves extend in a concentric circular ring pattern or in a scroll pattern about a datum point (the center of the mark area 15, for example) set in advance as a center. The pattern of the mark 18 may be a vertical-striped hair line mark pattern constituted of a plurality of fine grooves extending in a vertical direction, or a horizontal-striped hair line mark pattern constituted of a plurality of fine grooves extending in a horizontal direction. Furthermore, the pattern of the mark 18 may be a mark pattern in which vertical stripes and horizontal stripes intersect with each other.

Second Embodiment

Figure 7:
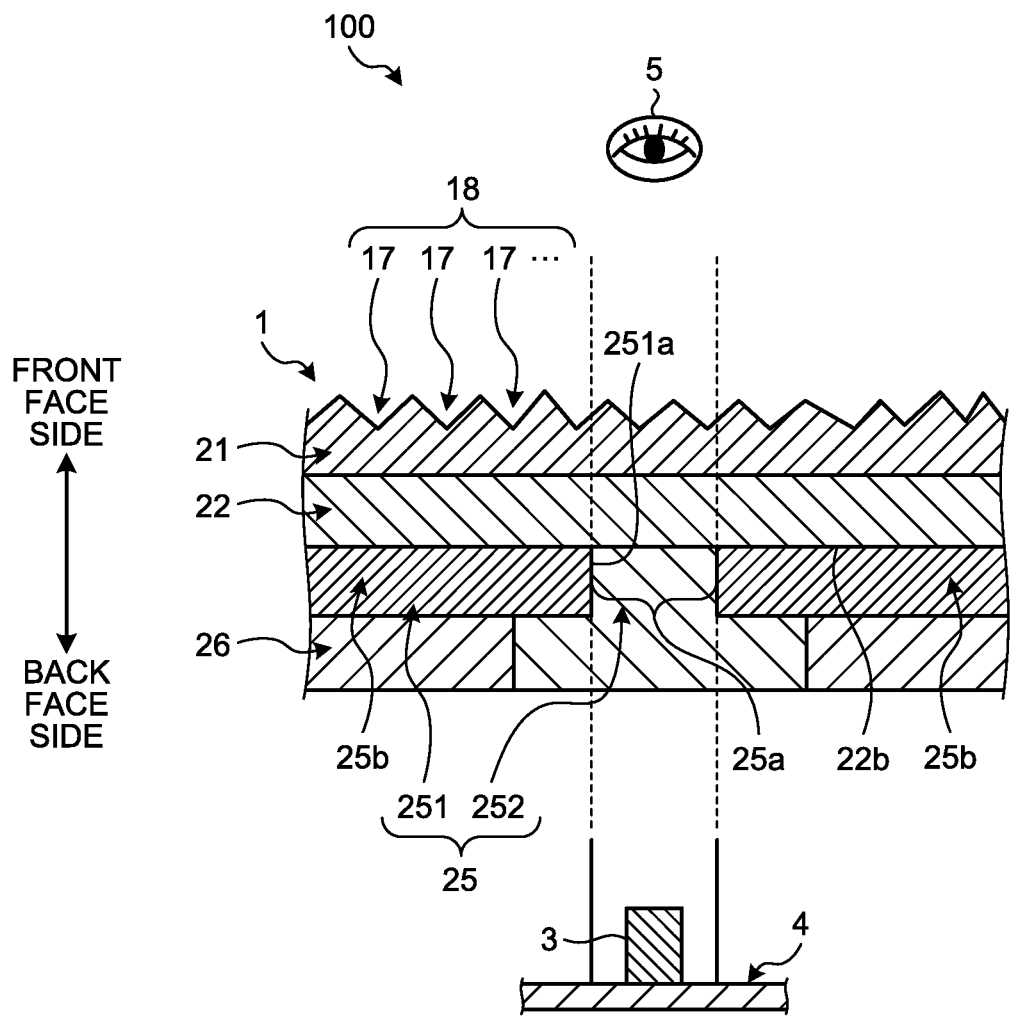
FIG. 7 is a sectional view of an automotive meter according to a second embodiment.
Figure 8:
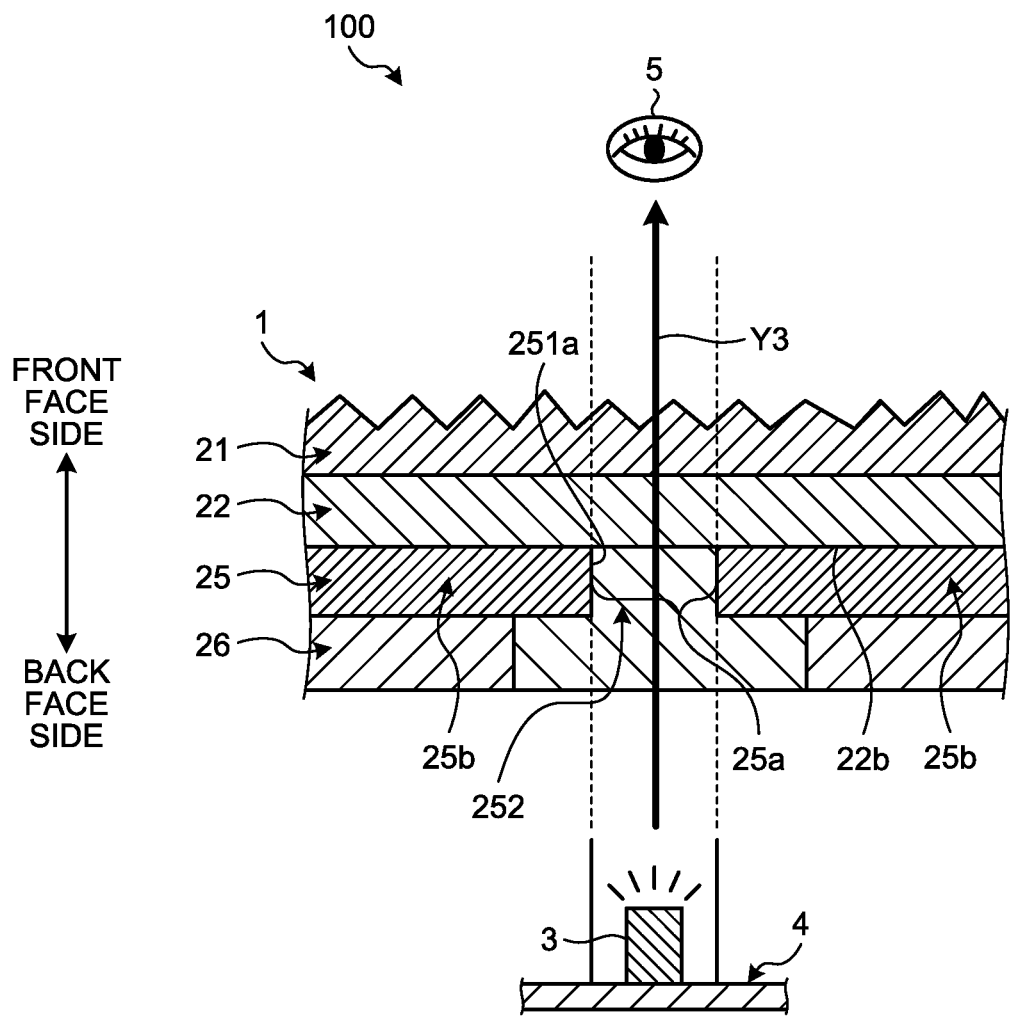
FIG. 8 is a sectional view illustrating the on-state of the light source in the automotive meter according to the second embodiment.

A second embodiment is explained with reference to FIG. 7 and FIG. 8. In the second embodiment, constitutional features having the identical functions with those explained in the above-mentioned first embodiment are given same numerals, and their repeated explanations are omitted. FIG. 7 is a sectional view of an automotive meter according to the second embodiment, and FIG. 8 is a sectional view illustrating the on-state of a light source in the automotive meter according to the second embodiment.

As illustrated in FIG. 7, a reflective layer 25 of the automotive meter 100 in the second embodiment has a mirror ink part 251 and a pearl ink part 252. The mirror ink part 251 is a laminated constitutional part composed of mirror ink. The mirror ink part 251 is formed by mirror ink printing applied to the back face of the base material layer 22. The mirror ink contains nontransparent metal powder through which light is incapable of passing, and has a high reflectance as compared with the pearl ink.

The mirror ink part 251 has at least one hollow area 251a. The shape of hollow area 251a corresponds to a shape of a display design. The mirror ink part 251 is a high reflection area higher in reflectance than the pearl ink part 252. The mirror ink part 251 is, for example, a total reflection area that totally reflects the light incident from the front face side thereof.

The pearl ink part 252 is composed of pearl ink. The pearl ink part 252 covers an area corresponding to the hollow area 251a on a back face 22b of the base material layer 22. In the dial plate 1 according to the second embodiment, the mirror ink part 251 is printed and thereafter, the pearl ink part 252 is printed from the back face side. The pearl ink part 252 is formed by pearl ink printing applied to the hollow area 251a and the area in the vicinity of the hollow area 251a. That is, the pearl ink part 252 is printed on the mirror ink part 251 and the base material layer 22 from the back face side in such a manner that the hollow area 251a of the mirror ink part 251 is filled with the pearl ink.

A light shielding layer 26 is formed on the back face of the mirror ink part 251. The light shielding layer 26 is, for example, a printed black-ink layer. The light shielding layer 26 is formed in such a manner that the light shielding layer 26 is not overlapped with at least the hollow area 251a. That is, the light shielding layer 26 covers the area other than the hollow area 251a in the mirror ink part 251 from the back face side thereof. The light shielding layer 26 is, for example, printed on an area except the area corresponding to the pearl ink part 252.

The light source 3 is arranged on the back face side of the dial plate 1 in the same manner as the case of the automotive meter 100 in the first embodiment. The light source 3 is arranged at the position such that the light source 3 faces the hollow area 251a in an opposed manner. The light sources 3 are, for example, arranged to face the respective hollow areas 251a one-to-one.

In the reflective layer 25, the pearl ink part 252 is a light transmission area 25a that allows the light emitted from the light source 3 to transmit therethrough to the front face side. The light transmission area 25a is a part corresponding to the hollow area 251a in the pearl ink part 252. In the reflective layer 25, an area 25b other than the light transmission area 25a is the mirror ink parts 251. The area 25b other than the light transmission area 25a is composed of mirror ink that is high in reflectance thus improving the appearance of the dial plate 1 as a metallic dial plate. The light shielding layer 26 covers the back face of the mirror ink part 251. In the dial plate 1 according to the second embodiment, the light shielding layer 26 is formed on the back face of the mirror ink part 251 and hence, the mirror ink part 251 is shielded from the light incident from the back face side thereof. Due to such constitution, the metal powder contained in the mirror ink is prevented from being observed as a shadow.

In the dial plate 1 according to the second embodiment, each of the mirror ink part 251 and the pearl ink parts 252 has a reflection property. Accordingly, when the light source 3 is turned off, each of the mirror ink part 251 and the pearl ink part 252 exhibits luster. The reflective layer 25 uniformly reflects light as a whole or substantially uniformly reflects light, or the pearl ink part 252 shines in the same manner as the case of the mirror ink part 251 thus obscuring the display design. In a state that the light source 3 is turned on, the light transmission area 25a of the pearl ink part 252 allows the light emitted from the light source 3 to transmit therethrough to the front face side as indicated by arrow Y3 in FIG. 8. Due to such constitution, the display design corresponding to the shape of the hollow area 251a is displayed.

Here, in the dial plate 1 according to the second embodiment, the light shielding layer 26 may be omitted. The dial plate 1 may be provided with a metal film formed by vapor deposition or the like in place of the mirror ink part 251.

Modification of Second Embodiment

Figure 9:
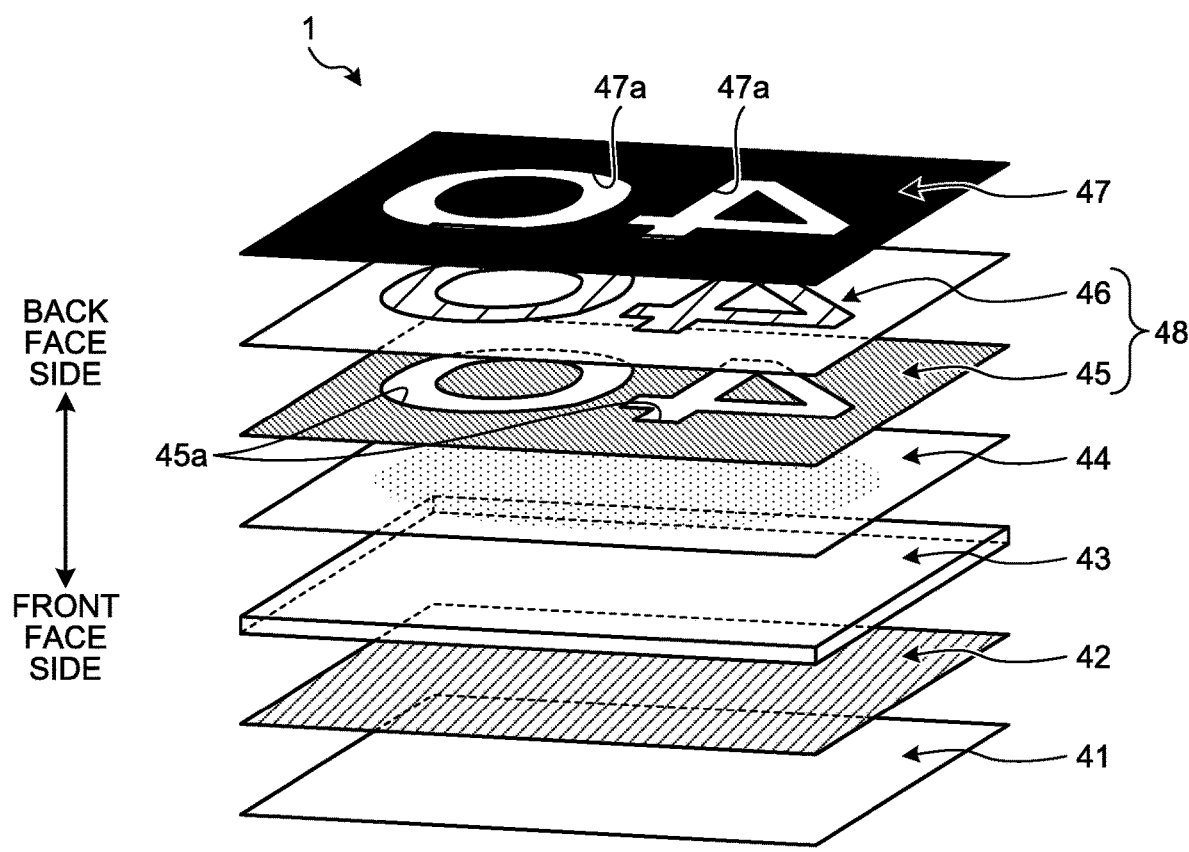
FIG. 9 is a view illustrating a layer structure of a dial plate according to a modification of the second embodiment.

The modification of the second embodiment is explained. FIG. 9 is a view illustrating a layer structure of a dial plate according to the modification of the second embodiment. As illustrated in FIG. 9, the dial plate 1 according to the modification of the second embodiment has a top coat layer 41, a transparent smoke layer 42, a base material layer 43, a mark layer 44, a reflective layer 48, and a light shielding layer 47. The top coat layer 41, the transparent smoke layer 42, the base material layer 43, and the mark layer 44 are, for example, same as the top coat layer 31, the transparent smoke layer 32, the base material layer 33, and the mark layer 34 in the first modification of the first embodiment, respectively.

The reflective layer 48 includes a mirror ink part 45 and a pearl ink part 46. The mirror ink part 45 is an ink layer composed of mirror ink, the ink layer being formed on the back face side of the mark layer 44. The mirror ink part 45 has at least one hollow area 45a. The shape of the hollow area 45a corresponds to a shape of a display design. That is, the mirror ink part 45 is a mirror ink layer formed by mirror ink printing applied to the mark layer 44 in such a manner that the mirror ink printing is not applied to the area corresponding to the shape of the display design.

The pearl ink part 46 is an ink layer composed of pearl ink, the ink layer being formed on the back face side of the mark layer 44. The pearl ink part 46 covers the hollow area 45a of the mirror ink part 45. That is, the mirror ink part 45 is formed and thereafter, the pearl ink part 46 is formed. In the reflective layer 48, the pearl ink part 46 corresponds to a light transmission area, and the mirror ink part 45 corresponds to an area other than the light transmission area.

The light shielding layer 47 is formed on the back face side of the reflective layer 48. The light shielding layer 47 is, for example, a printed black-ink layer printed on the back face of the reflective layer 48. The Light shielding layer 47 has at least one hollow area 47a. The shape of the hollow area 47a corresponds to a shape of a display design. The light shielding layer 47 covers the mirror ink part 45, and exposes the back face of the pearl ink part 46. The light shielding layer 47 shields the back face of the mirror ink part 45, and restricts the light incident from the back face side toward the mirror ink part 45.

Another Modification of Embodiments

Figure 10:
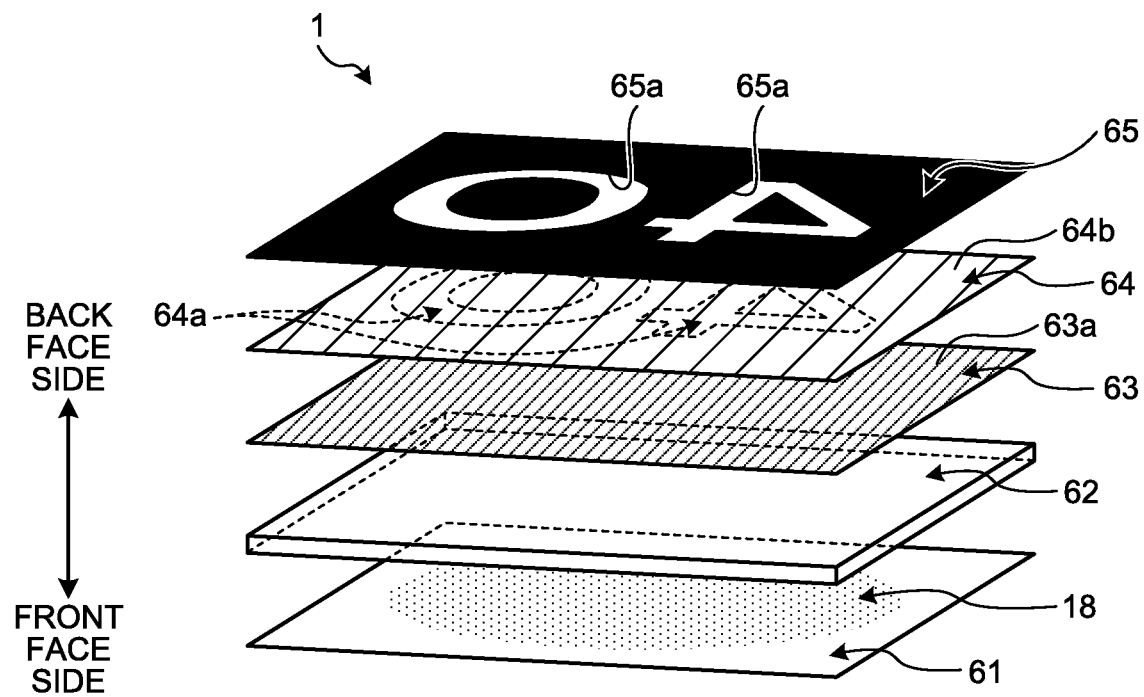
FIG. 10 is a view illustrating a layer structure of a dial plate according to another modification of the embodiments.

Another modification of the first embodiment and the second embodiment is explained. FIG. 10 is a view illustrating a layer structure of a dial plate according to another modification of the embodiments. In the dial plate according to the present modification, a transparent smoke layer 63 is formed between a base material layer 62 and a reflective layer 64. As illustrated in FIG. 10, the dial plate 1 according to the present modification has a mark layer 61, the base material layer 62, the transparent smoke layer 63, the reflective layer 64, and a light shielding layer 65. The mark layer 61, the base material layer 62, the transparent smoke layer 63, the reflective layer 64, and the light shielding layer 65 are, for example, same as the mark layer 34, the base material layer 33, the transparent smoke layer 32, the reflective layer 35, and the light shielding layer 36 of the first modification of the first embodiment, respectively. The mark layer 61, the base material layer 62, the transparent smoke layer 63, the reflective layer 64, and the light shielding layer 65 are laminated towards the back face side from the front face side.

The transparent smoke layer 63 is a semitransparent layer that adjusts the tint of the dial plate 1. The transparent smoke layer 63 is, for example, formed by smoke printing. The transparent smoke layer 63 may be any of a colorless layer and a colored layer. A color of the transparent smoke layer 63 may be blue, brown, or black.

The reflective layer 64 is, for example, entirely composed of pearl ink. The reflective layer 64 of the present modification is a printed pearl-ink layer printed on the back face 63a of the transparent smoke layer 63. The reflective layer 64 has a light transmission area 64a. The light transmission area 64a is an area that allows light to transmit to the front face side thereof from the back face side thereof.

The light shielding layer 65 is formed on the back face side of the reflective layer 64. The light shielding layer 65 is, for example, a printed black-ink layer printed on the back face of the reflective layer 64. The light shielding layer 65 has at least one hollow area 65a. The shape of the hollow area 65a is formed in a shape of a display design. The light shielding layer 65 covers other area 64b in the reflective layer 64. The other area 64b is an area other than the light transmission area 64a in the reflective layer 64.

The contents disclosed in the above-mentioned embodiments and modifications can be brought into practice by optionally combining the embodiments and the modifications with each other.

The dial plate according to the embodiment is provided with the mark layer that is configured to transmit light and includes numbers of linear grooves formed on a surface thereof, and the reflective layer that is arranged on a back face side of the mark layer and reflects light incident from the mark-layer side. The reflective layer includes a light transmission area that allows light emitted from a light source arranged on the back face side to transmit therethrough toward the front-face side, and displays a display design by the light transmitting through the light transmission area when the light source is turned on. In the reflective layer, at least the light transmission area is composed of pearl ink. The dial plate and the automotive meter having the dial plate according to the embodiment achieve the advantageous effect such that the display design is inconspicuous when the light source is turned off.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dial plate comprising:
a mark layer configured to transmit light, the mark layer including numbers of linear grooves formed on a surface of the mark layer;
a reflective layer arranged on a back face side of the mark layer, the reflective layer being configured to reflect light incident from the mark layer side; and
a transparent or semitransparent base material layer interposed between the mark layer and the reflective layer;
a light shielding layer arranged on a back side face of the reflective layer, wherein
the reflective layer includes a light transmission area directly formed on a back face side of the base material layer and configured to allow light which is emitted from a light source arranged on the back face side of the light transmission area to transmit through the light transmission area to a front face side of the light transmission area, and display a display design by the light transmitting through the light transmission area when the light source is turned on,
the light transmission area in the reflective layer is composed of a first material with a first refractive index, and a second material with a second refractive index that is layered on the first material, wherein the first refractive index is different than the second refractive index,
the reflective layer includes an area other than the light transmission area that is directly formed on the back face side of the base material layer and composed of a non-transparent material that reflects light, and
the light shielding layer does not extend over the light transmission area of the reflective layer.

2. An automotive meter comprising:
a dial plate including a mark layer configured to transmit light, the mark layer including numbers of linear grooves formed on a surface of the mark layer, and a reflective layer arranged on a back face side of the mark layer, the reflective layer being configured to reflect light incident from the mark layer side;
a transparent or semitransparent base material layer interposed between the mark layer and the reflective layer; and
a light source arranged on the back face side of the reflective layer;
a light shielding layer arranged on the back side face of the reflective layer, wherein
the reflective layer includes a light transmission area directly formed on a back face side of the base material layer and configured to allow light which is emitted from the light source to transmit through the light transmission area to a front face side of the light transmission area, and display a display design by the light transmitting through the light transmission area when the light source is turned on,
the light transmission area in the reflective layer is composed of a first material with a first refractive index, and a second material with a second refractive index that is layered on the first material, wherein the first refractive index is different than the second refractive index,
the reflective layer includes an area other than the light transmission area that is directly formed on the back face side of the base material layer and composed of a non-transparent material that reflects light, and
the light shielding layer does not extend over the light transmission area of the reflective layer.

\* \* \* \* \*